(12) United States Patent
Yamamoto

(10) Patent No.: US 10,142,502 B2
(45) Date of Patent: Nov. 27, 2018

(54) IMAGE READING APPARATUS AND IMAGE FORMING APPARATUS INCLUDING STORAGE WHICH STORES INFORMATION RELATING TO SHEET SIZE DETECTED BY SIZE DETECTOR

(71) Applicant: CANON KABUSHIKI KAISHA, Tokyo (JP)

(72) Inventor: Yuichi Yamamoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/932,797

(22) Filed: Nov. 4, 2015

(65) Prior Publication Data

US 2016/0134769 A1    May 12, 2016

(30) Foreign Application Priority Data

Nov. 8, 2014  (JP) .................................. 2014-227607

(51) Int. Cl.
*H04N 1/40*   (2006.01)
*H04N 1/00*   (2006.01)

(52) U.S. Cl.
CPC ..... *H04N 1/00554* (2013.01); *H04N 1/00588* (2013.01); *H04N 1/00708* (2013.01); *H04N 1/00795* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,500,725 | A | * | 3/1996 | Takasu .................. G03G 15/607 250/559.24 |
| 6,456,365 | B1 | * | 9/2002 | Hosaka .................... B41J 29/13 347/101 |
| 8,861,047 | B2 | | 10/2014 | Ishido |
| 2001/0043367 | A1 | * | 11/2001 | Ogino ................ H04N 1/00413 358/449 |
| 2003/0198493 | A1 | | 10/2003 | Gomi et al. |
| 2004/0165223 | A1 | * | 8/2004 | Ishido ................ H04N 1/00551 358/449 |
| 2004/0234311 | A1 | | 11/2004 | Adams |
| 2006/0180972 | A1 | * | 8/2006 | Suzuki ................. G03G 15/605 271/3.14 |

(Continued)

FOREIGN PATENT DOCUMENTS

| CN | 101071260 A | 11/2007 |
|---|---|---|
| CN | 101834972 A | 9/2010 |

(Continued)

*Primary Examiner* — Barbara Reiner
(74) *Attorney, Agent, or Firm* — Canon U.S.A., Inc. IP Division

(57) ABSTRACT

In a case where a user places a document placed on a document positioning glass plate without sufficiently opening an automatic document feeding device, sheet size information will not be reset and an image may be read based on incorrect size information. Therefore, in the present invention, an angle at which the size information is reset is set to an angle between a first angle at which the automatic document feeding device is closed, and a second angle (θ1) at which the automatic document feeding device is moved to open automatically after being released from a holding state by a holding unit.

15 Claims, 14 Drawing Sheets

(56) References Cited

U.S. PATENT DOCUMENTS

| | | | |
|---|---|---|---|
| 2006/0227305 A1 | 10/2006 | Pee et al. | |
| 2006/0288533 A1* | 12/2006 | Lee | E05F 5/02 |
| | | | 16/330 |
| 2010/0103479 A1 | 4/2010 | Seo | |
| 2011/0072727 A1* | 3/2011 | Kumazawa | G03G 15/605 |
| | | | 49/358 |
| 2012/0033246 A1 | 2/2012 | Unno | |
| 2014/0368894 A1* | 12/2014 | Yamamoto | G03G 15/605 |
| | | | 358/498 |
| 2015/0015920 A1* | 1/2015 | Muraoka | H04N 1/00554 |
| | | | 358/400 |
| 2015/0296093 A1* | 10/2015 | Yamamoto | G03G 15/605 |
| | | | 358/474 |

FOREIGN PATENT DOCUMENTS

| | | |
|---|---|---|
| EP | 2104327 A2 | 9/2009 |
| JP | H02-167536 A | 6/1990 |
| JP | 3-184059 A | 8/1991 |
| JP | 2000-200014 A | 7/2000 |
| JP | 2001-290226 A | 10/2001 |

\* cited by examiner

IMAGE READING APPARATUS AND IMAGE FORMING APPARATUS INCLUDING STORAGE WHICH STORES INFORMATION RELATING TO SHEET SIZE DETECTED BY SIZE DETECTOR

BACKGROUND OF THE INVENTION

Field of the Invention

The present invention relates to an image reading apparatus including an opening-closing unit disposed on an apparatus main body in an openable/closable state and a size detection unit for detecting a sheet size, and an image forming apparatus.

Description of the Related Art

An image forming apparatus such as a copying machine that includes an image reading apparatus mounted on the upper side of an image forming unit has been known. The image reading apparatus automatically reads an image regarded as a reading target formed on a sheet (hereinafter, referred to as "document"). The image reading apparatus includes a reading unit and an automatic document feeding device. The automatic document feeding device is disposed in an openable/closable state relative to a transparent glass (hereinafter, referred to as "document positioning glass plate") provided on an upper face of a main body of the reading unit. An image reading unit for reading an image is disposed under the document positioning glass plate.

An image on a document is read through any of the two reading methods such as a feeding-reading method and a fixed-reading method. In the feeding-reading method, in a state where the automatic document feeding device is closed, the automatic document feeding device sequentially and individually conveys documents to the document positioning glass plate where the image reading unit is provided, so that the image reading unit automatically reads the images on the documents one-by-one. In the fixed-reading method, a user opens the automatic document feeding device to uncover the document positioning glass plate, and places a document on the document positioning glass plate. Thereafter, the user closes the automatic document feeding device so that an image on the document is read by the image reading unit.

In order to convey a document automatically, the automatic document feeding device includes a large number of built-in components such as various rollers and motors. Therefore, the automatic document feeding device has a weight of several kilograms to tens of kilograms, and thus it is not easy for a user to open or close the automatic document feeding device as it is. Therefore, the automatic document feeding device is normally provided with an opening-closing unit supporting unit having a hinge (hereinafter, referred to as "hinge unit").

The hinge unit has a built-in spring in order to urge the automatic document feeding device in an opening direction that is a direction in which a weight of the automatic document feeding device (hereinafter, referred to as "own weight") is cancelled. Therefore, the spring and own weight thereof are balanced with each other, so that a user can open and lift up the automatic document feeding device with little force and softly close the automatic document feeding device. The above configuration enables a user to easily place or remove a document on/from the document positioning glass plate.

In order to enable a user to easily place or remove a document on/from the document positioning glass plate, Japanese Patent Application Laid-Open No. 3-184059 discusses a configuration for favorably setting the balance between a spring and own weight. Further, in order to read a document placed on a document positioning glass plate, U.S. Pat. No. 8,861,047 discusses a configuration for automatically detecting a size of the document placed on the document positioning glass plate. In the above-described technique, an image reading unit reads an image of the document according to a detected document size. Then, information about the detected document size is reset when the automatic document feeding device is opened up to a predetermined position.

When a document placed on the document positioning glass plate is to be replaced, an angle at which the automatic document feeding device is opened may vary depending on the users. In a case where the automatic document feeding device is not opened up to a position where the size information is reset when a user replaces a document, the size information set for a previous document-reading operation will not be reset. Therefore, a problem arises that the document-reading operation is executed based on the size information set for the previous document-reading operation even if the user places a document that has a size different from the size set for the previous document-reading operation. Further, in order to solve the above problem, there has been provided a configuration in which the size information is reset when the automatic document feeding device is opened just a little. However, with this configuration, there is a risk that the size information may be reset when a user slightly touches the automatic document feeding device.

SUMMARY OF THE INVENTION

The present invention is directed to an image reading apparatus capable of preventing a problem in which an image is read based on incorrect size information because of failure in resetting the sheet size information.

An image reading apparatus according to the present invention includes a sheet positioning plate on which a sheet from which an image is to be read is placed, an opening-closing unit configured to open or close the sheet positioning plate, and configured such that an opening angle of the opening-closing unit is defined as an angle of the opening-closing unit relative to the sheet positioning plate, a holding unit configured to releasably hold the opening-closing unit at a first opening angle where the opening-closing unit closes the sheet positioning plate, an opening-closing unit supporting unit configured to rotatably support the opening-closing unit relative to the sheet positioning plate, and move the opening-closing unit to open at a second opening angle, after the opening-closing unit is released from a holding state by the holding unit, a size detection unit configured to detect a size of a sheet placed on the sheet positioning plate, and a storage unit configured to store the size of the sheet detected by the size detection unit, wherein the size of the sheet stored in the storage unit is reset when the opening-closing unit is moved from the first opening angle to a third opening angle that is between the first opening angle and the second opening angle.

Further features of the present invention will become apparent from the following description of embodiments with reference to the attached drawings.

DESCRIPTION OF THE EMBODIMENTS

Hereinafter, embodiments of the present invention will be described with reference to FIGS. 1 to 13. Each of the embodiments of the present invention described below can be implemented solely or as a combination of a plurality of the embodiments or features thereof where necessary or where the combination of elements or features from individual embodiments in a single embodiment is beneficial.

Figure 1:
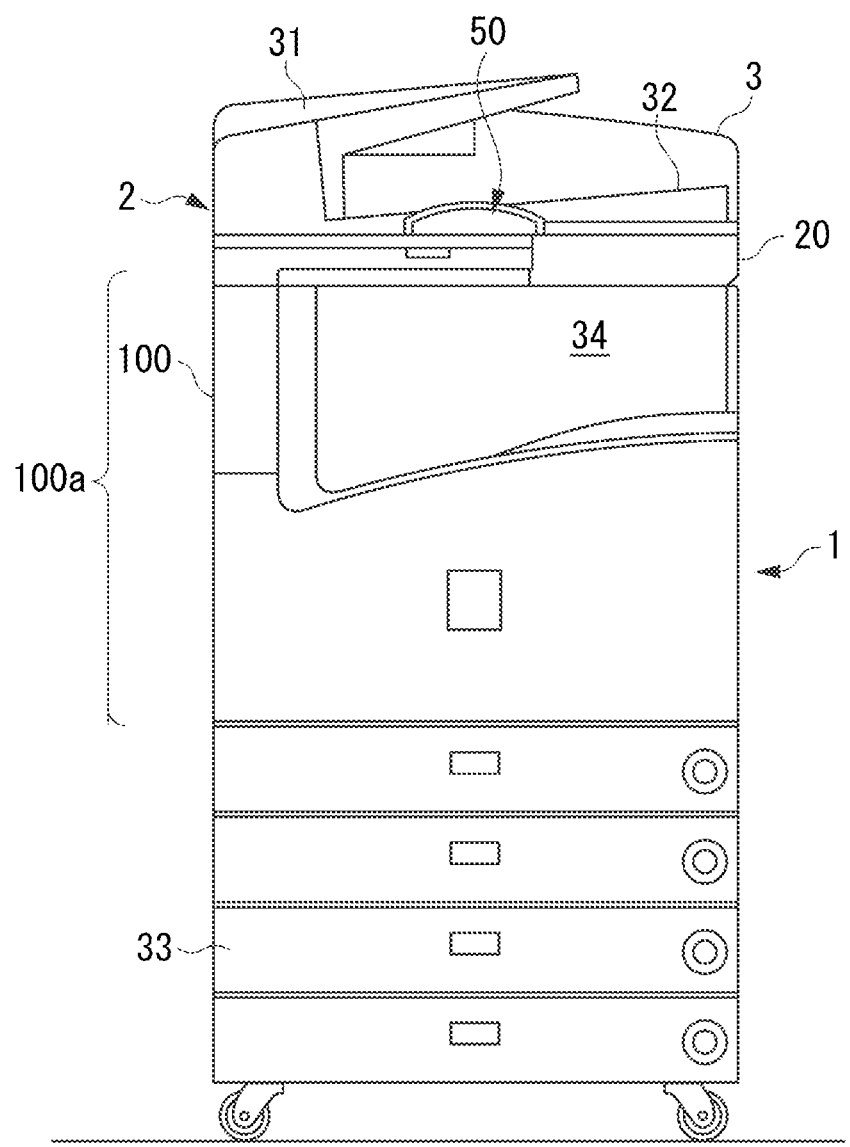
FIG. 1 is a diagram schematically illustrating a configuration of an image forming apparatus.
Figure 2:
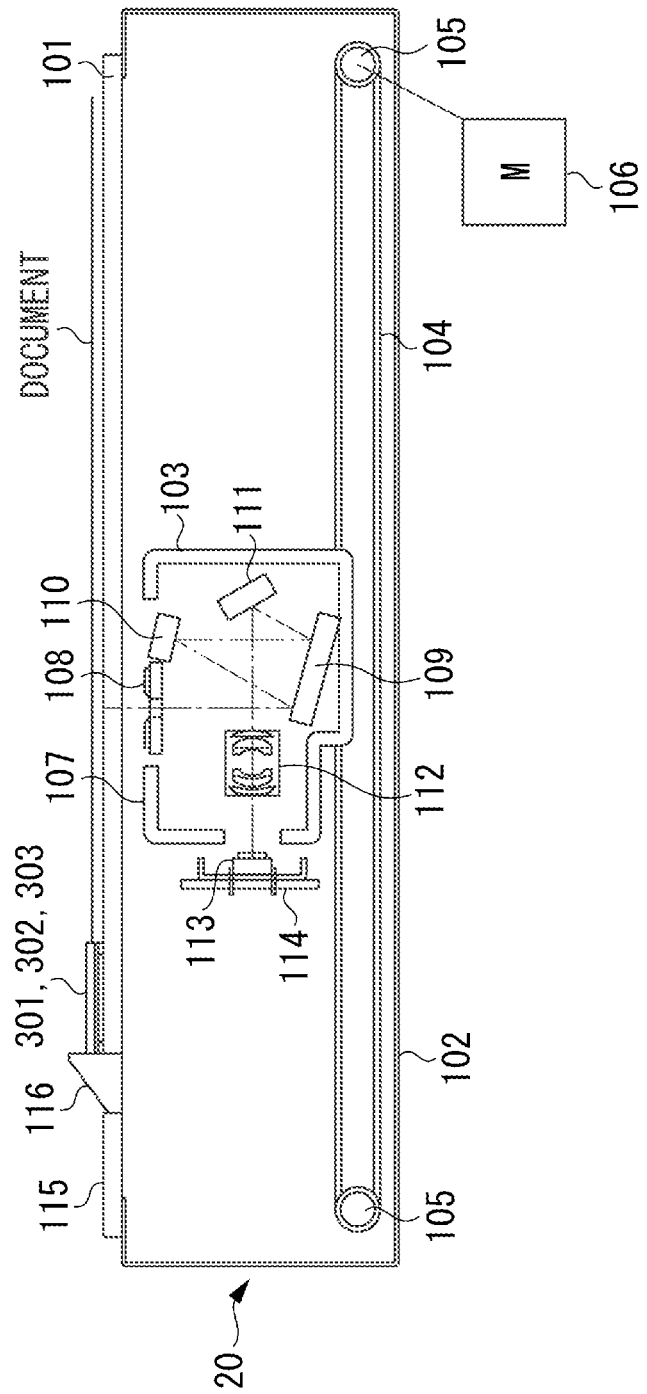
FIG. 2 is a diagram schematically illustrating a configuration of an image reading apparatus.

A first embodiment will be described. FIGS. 1 and 2 are diagrams schematically illustrating a configuration of an image forming apparatus according to the present embodiment.

An image forming apparatus 1 illustrated in FIG. 1 is configured of an image forming apparatus main body 100 (hereinafter, referred to as "main body 100") and an image reading apparatus 200 mounted on an upper face of the main body 100.

An image forming unit 100a is disposed on an approximately central portion of the main body 100, and a sheet supplying unit is disposed on the lower side thereof. Further, the image reading apparatus 200 for reading an image of the document is disposed on an uppermost portion of the main body 100. Then, a sheet discharge space portion 34 is formed on a space between the image reading apparatus 200 and the image forming unit 100a. The image reading apparatus 200 is configured of a reading unit 20 having a scanning unit 103 that serves as an image reading unit, and an automatic document feeding device 2 for automatically feeding a document to the reading unit 20. The image forming unit 100a can form an image on a recording medium such as a sheet based on the image information read by the image reading apparatus 200.

In the main body 100, the image forming unit 100a is configured as a known electro-photographic type printing engine including a laser writing unit, an electro-photographic processing unit, and a fixing unit, which are not illustrated in FIG. 1. The image forming unit 100a forms an image on a sheet. The sheet supplying unit includes a sheet supplying cassette 33, and the sheets stacked on the sheet supplying cassette 33 are supplied to the image forming unit 100a through a sheet feeding unit such as a sheet feeding roller.

The reading unit 20 includes a document positioning glass plate 101 (i.e., sheet positioning plate) configured of a transparent glass disposed on an upper surface of a frame member 102 and the scanning unit 103 (i.e., image reading unit) disposed on the lower side thereof. The automatic document feeding device 2 is mounted on the frame member 102 on the upper portion of the main body 101 by a hinge unit 10 serving as an opening-closing unit supporting unit disposed on a rear side of the automatic document feeding device 2. A configuration of the hinge unit 10 will be described below. The automatic document feeding device 2 is rotatably supported by the hinge unit 10 on the frame member 102 of the reading unit that serves as an apparatus main body of the image reading apparatus 200. The automatic document feeding device 2 is disposed to be able to cover or uncover the document positioning glass plate 101. Documents (sheets) on which images regarded as reading-targets are formed are set to a document positioning plate 31. A bundle of the set documents are conveyed onto the document positioning glass plate 101 one-by-one from the uppermost document by a sheet conveyance unit such as a conveyance roller, so that the images are read by the scanning unit 103 at an image reading position. After the images are read by the scanning unit 103, the documents are sequentially discharged onto a document discharge plate 32. The structure and mechanism of the automatic document feeding device 2 are the same as those described in a conventionally-known technique, and thus detailed description thereof will be omitted.

In a case where an image is read from a document such as a book or a notebook that cannot be fed automatically, the automatic document feeding device 2 can be used as a pressing plate. In other words, a user opens and places the book or the notebook on the upper surface of the document positioning glass plate 101, and presses the book or the notebook with the automatic document feeding device 2 from the above in order to read an image thereof.

Subsequently, a schematic configuration of the reading unit 20 according to the present embodiment will be described with reference to FIG. 2.

The reader unit 20 includes the document positioning glass plate 101 on which a document is placed, the frame member 102 for supporting the document positioning glass plate 101, the scanning unit (i.e., image reading unit) 103 for scanning a document, a belt 104 for moving the scanning unit 103, a pulley 105 for driving the belt 104, and a motor 106 for rotating the pulley 105.

The scanning unit (i.e., image reading unit) 103 includes a carriage frame member 107. An illumination unit 108 for illuminating a document, reflection mirrors 109, 110, and 111 for guiding light diffused from a document, a lens 112 for collecting the light to form an image, a charge coupled device (CCD) 113 for executing photoelectric conversion in order to read the light that forms an image, and an electric substrate 114 for driving the CCD 113 are integrally mounted on the carriage frame member 107.

In order to read an image on a document, the motor 106 rotates the pulley 105 to drive the belt 104 to cause the scanning unit 103 to move along the document to perform a scanning operation, while the document is being illuminated by the illumination unit 108. The light reaching the document is diffused from a surface of the document and guided to the lens 112 by the reflection mirrors 109, 110, and 111 in order to form an image. Thereafter, the light that forms an image is photo-electrically converted and electrically read by the CCD 113.

White-color reference members 301, 302, and 303 constitute a unit that provides white reference data for executing shading correction. The scanning unit 103 is moved to the white-color reference members 301, 302, and 303 in order to execute the shading correction before reading the image on the document.

A feeding-reading glass (transparent glass) 115 is used as a reading position in a feeding-reading mode using the automatic document feeding device 2. A document supplied from a sheet supplying portion (not illustrated) of the automatic document feeding device 2 passes over the feeding-reading glass 115, so that an image on the document is read by the scanning unit 103 that stops and stands ready on the lower side of the feeding-reading glass 115. An inclination guide 116 is a guiding member that lifts up a leading end of the document passing over the feeding-reading glass 115 to guide the document into the automatic document feeding device again.

Figure 4:
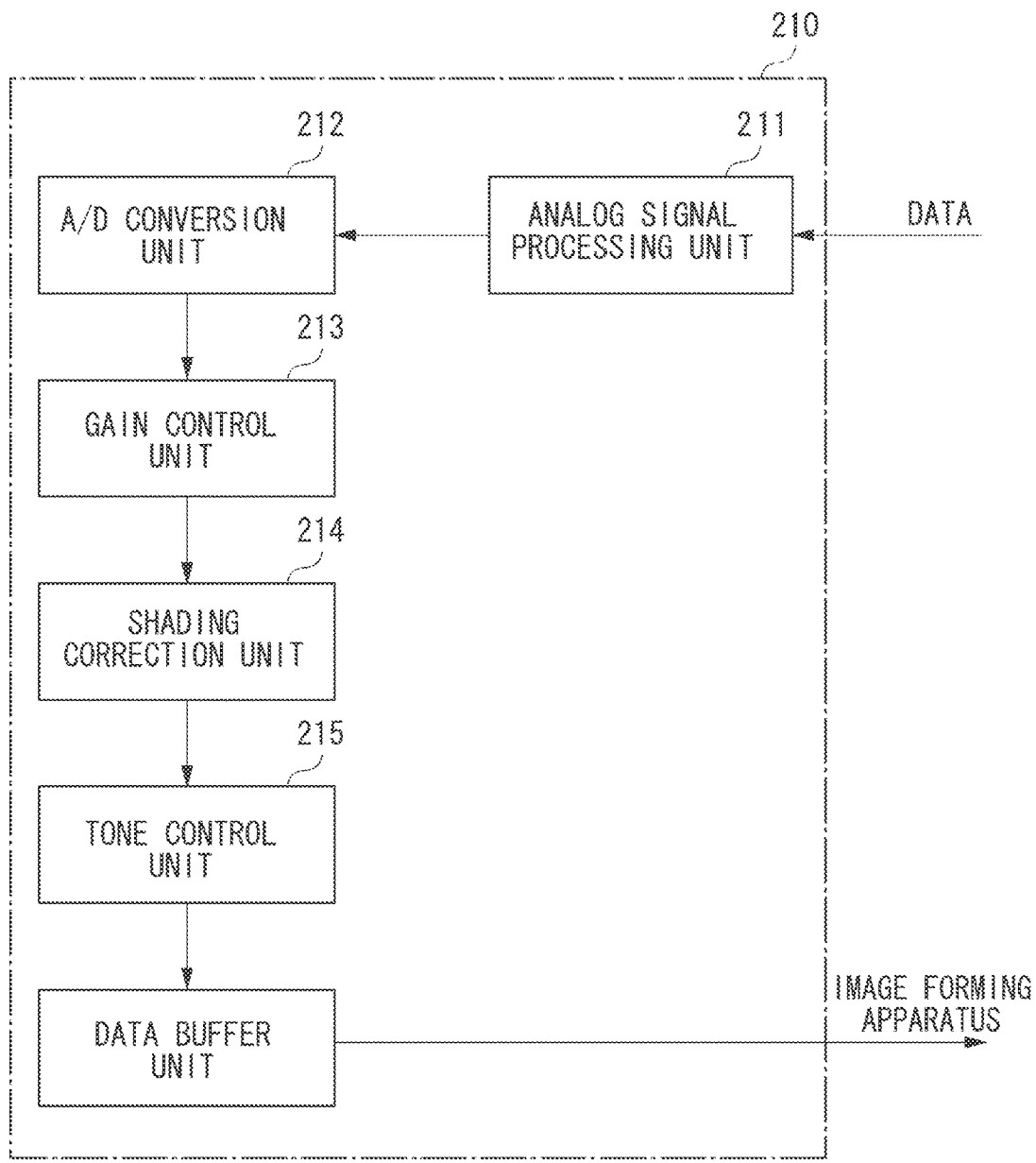
FIG. 4 is a control block diagram of an image processing unit.

Next, shading correction will be described with reference to FIGS. 2 and 4.

As illustrated in FIG. 2, in order to execute the shading correction, the scanning unit 103 is moved onto the lower side of the shading white plate 302 provided together with the document positioning glass plate 101.

When image data is acquired by an image processing unit 210, an analog signal processing unit 211 makes various kinds of correction such as sensitivity correction on the image data, and an analog-digital (A/D) conversion unit 212 converts the image data into a digital image signal. Then, a gain control unit 213, a shading correction unit 214, and a tone control unit 215 further make various kinds of correction on the image data. Thereafter, the image data is transmitted to the image forming unit 100a of the image forming apparatus 1 as digital data.

Figure 3:
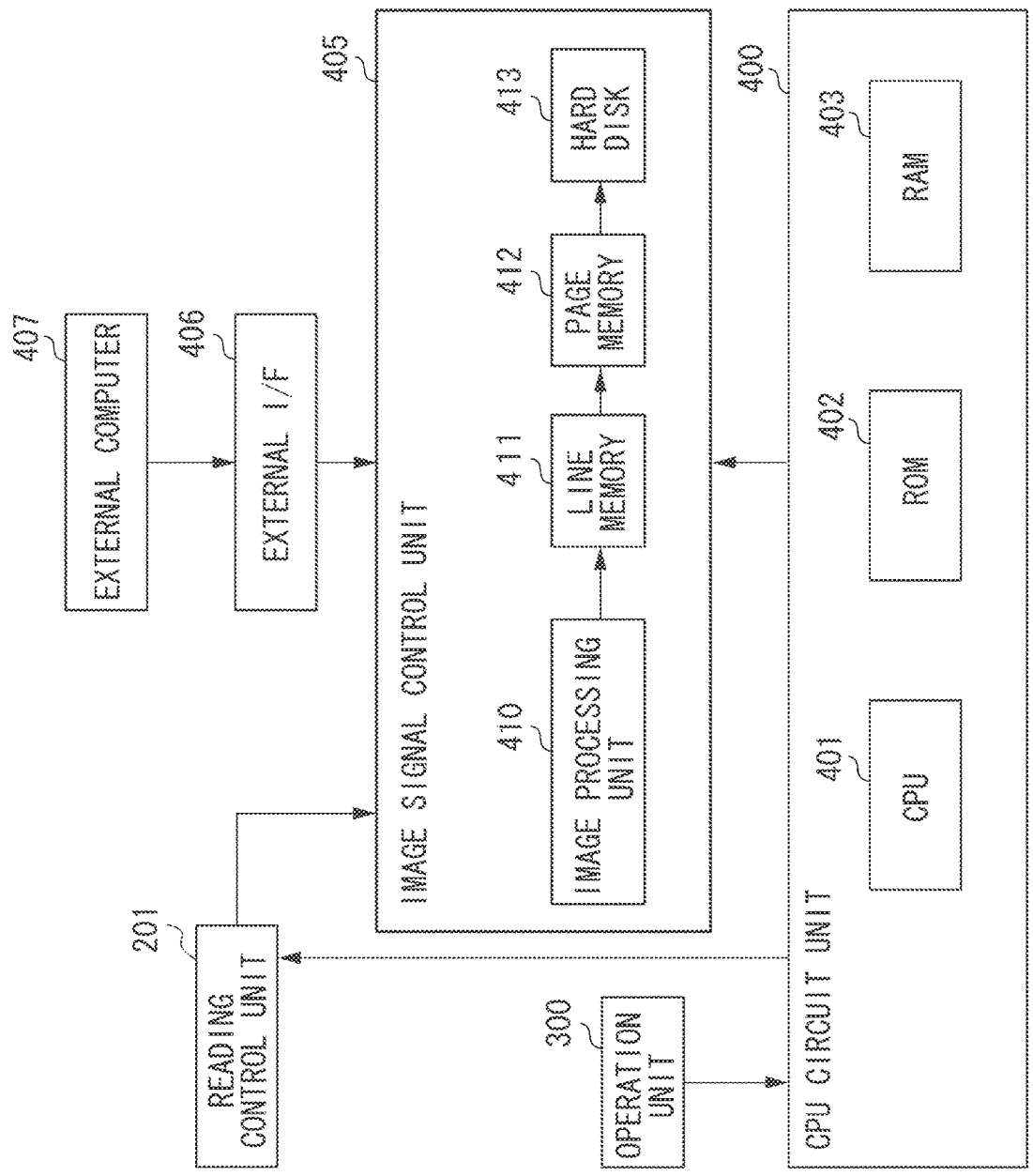
FIG. 3 is a block diagram illustrating a circuit structure and an image signal control unit of the image reading apparatus.

Next, a configuration for controlling the above-described units will be described with reference to a block diagram in FIG. 3.

A central processing unit (CPU) circuit unit 400 includes a CPU 401. Based on a program stored in a read only memory (ROM) 402, the CPU circuit unit 400 controls a reading control unit 201, an image signal control unit 405, and an external interface (I/F) 406 according to the settings set through an operation unit 300. A random access memory (RAM) 403 is used as a region where the control data is temporarily stored, or a work region where calculation relating to the control processing is executed. The external I/F 406 serves as an interface of a computer 407, and rasterizes print data into image data to output the image data to the image signal control unit 405.

An image processing unit 410 executes image correction processing and editing processing according to the settings set through the operation unit 300. A line memory 411 executes mirror-image processing in order to interchange a main scanning direction and a sub-scanning direction. An image stored in the line memory 411 is output via a page memory 412. A hard disk 413 is used as necessary in order to change a page order.

Subsequently, a configuration of the hinge unit 10 will be described with reference to FIGS. 5 to 10.

Figure 5:
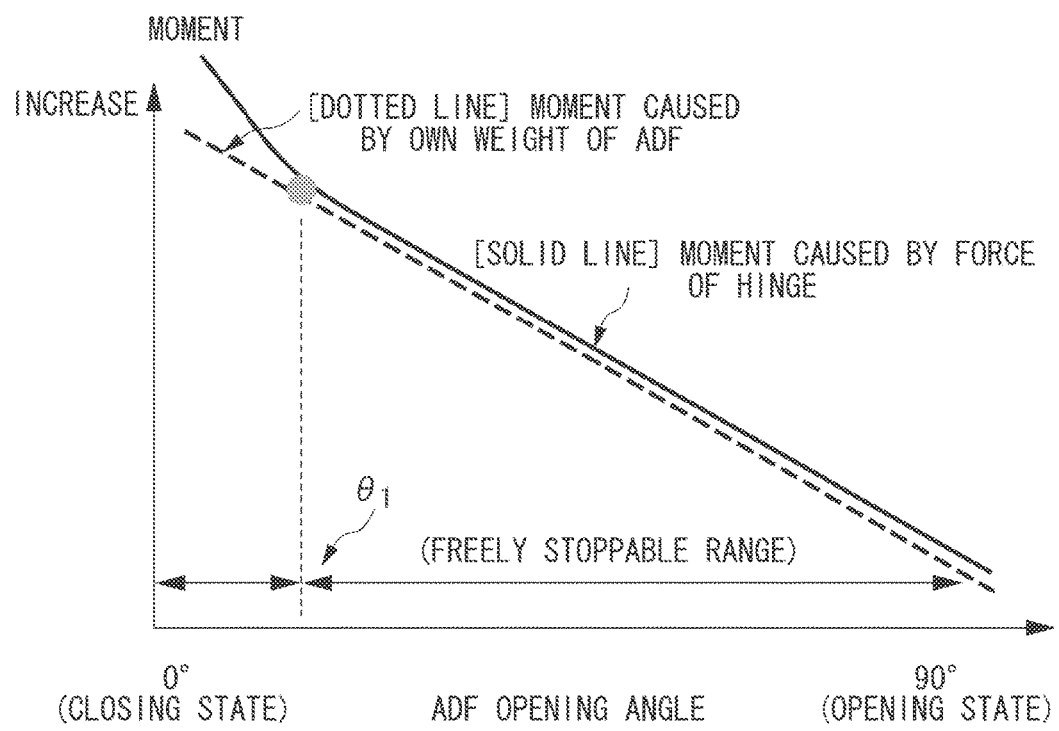
FIG. 5 is a graph illustrating a relationship between the weight of an automatic document feeding device and hinge spring force.

FIG. 5 is a graph illustrating a relationship between the moments arising in the automatic document feeding device 2 because of the weight of the automatic document feeding device 2 (e.g. the automatic document feeding device's own weight) and a force (hereinafter, referred to as "hinge spring force") of a spring disposed on the hinge unit 10 when the hinge unit 10 according to the present embodiment is used. A horizontal axis represents an opening angle of the automatic document feeding device 2 relative to the document positioning glass plate 101, whereas a vertical axis represents the moment. The automatic document feeding device 2 covers the document positioning glass plate 101 when the opening angle thereof is 0 degree. A dotted line in FIG. 5 represents the moment caused by the weight of the automatic document feeding device 2 that is applied in a direction in which the automatic document feeding device 2 is closed. A solid line in FIG. 5 represents the moment caused by the hinge spring force that is applied in a direction in which the automatic document feeding device 2 is opened. At an opening angle equal to or less than a predetermined angle θ1, the moment caused by the hinge spring force is set to be greater than the moment caused by the weight of the automatic document feeding device 2. At an opening angle greater than the predetermined angle θ1, the moment caused by the weight of the automatic document feeding device 2 and the moment caused by the hinge spring force are set to be balanced with each other. Therefore, the automatic document feeding device 2 can be opened with little force, and the user can stop the automatic document feeding device 2 at a desired position when the opening angle is equal to or greater than the predetermined angle θ1.

Figure 6:
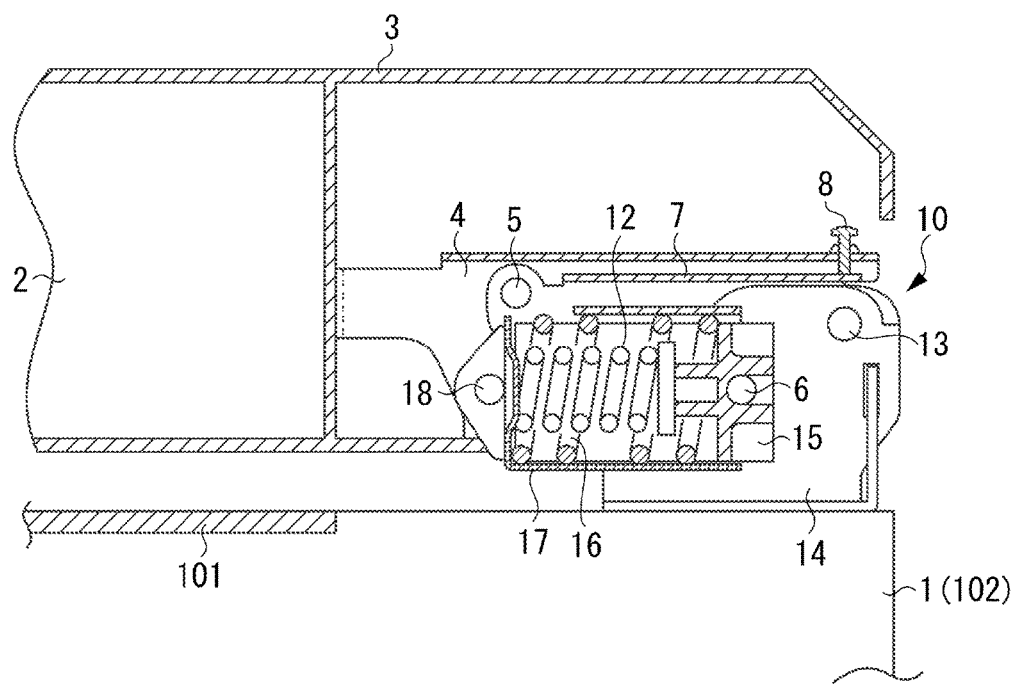
FIG. 6 is a diagram schematically illustrating internal components of a hinge unit.

FIG. 6 is a cross-sectional diagram of the hinge unit 10 according to the present embodiment. The automatic document feeding device 2 is covered with a cover 3 serving as an external constituent member. The automatic document feeding device 2 is attached to the frame member 102 via the hinge unit 10 in order to be openable or closable relative to the document positioning glass plate 101. The hinge unit 10 is configured of a lift arm 4, a lift shaft 5, a spring shaft 6, a hinge arm 7, a height adjustment screw 8, a compression spring 12 (urging unit), a hinge shaft 13, a hinge base 14, a spring holder 15, a compression spring 16 (urging unit), a spring holder 17, and a spring shaft 18. The hinge shaft 13 is supported by the hinge base 14. The hinge base 14 is fixed to the frame member 102. Further, the hinge base 14 axially supports the hinge arm 7, so that the hinge arm 7 is rotatable relative to the hinge base 14.

Furthermore, the hinge arm 7 supports the lift arm 4 via the lift shaft 5. The lift arm 4 is rotatable relative to the hinge arm 7. The height adjustment screw 8 is movably fixed to the lift arm 4. A leading end of the height adjustment screw 8 is in contact with a part of the hinge arm 7, so that a height of the automatic document feeding device 2 relative to the document positioning glass plate 101 can be adjusted thereby. The lift arm 4 is fixed to the automatic document feeding device 2 (i.e., cover 3) to support the spring shaft 18. The spring shaft 18 axially supports the spring holder 17. The spring holder 17 holds respective end portions of the compression springs 12 and 16, while the spring holder 15 disposed on the opposite side thereof holds other end portions of the compression springs 12 and 16. The spring holder 15 is axially supported by the spring shaft 6. Because the spring shaft 6 is fixed to the hinge base 14, a space between the spring shafts 18 and 6 is changed when the automatic document feeding device 2 is opened or closed, and the compression springs 12 and 16 are stretched or compressed accordingly.

Figure 7:
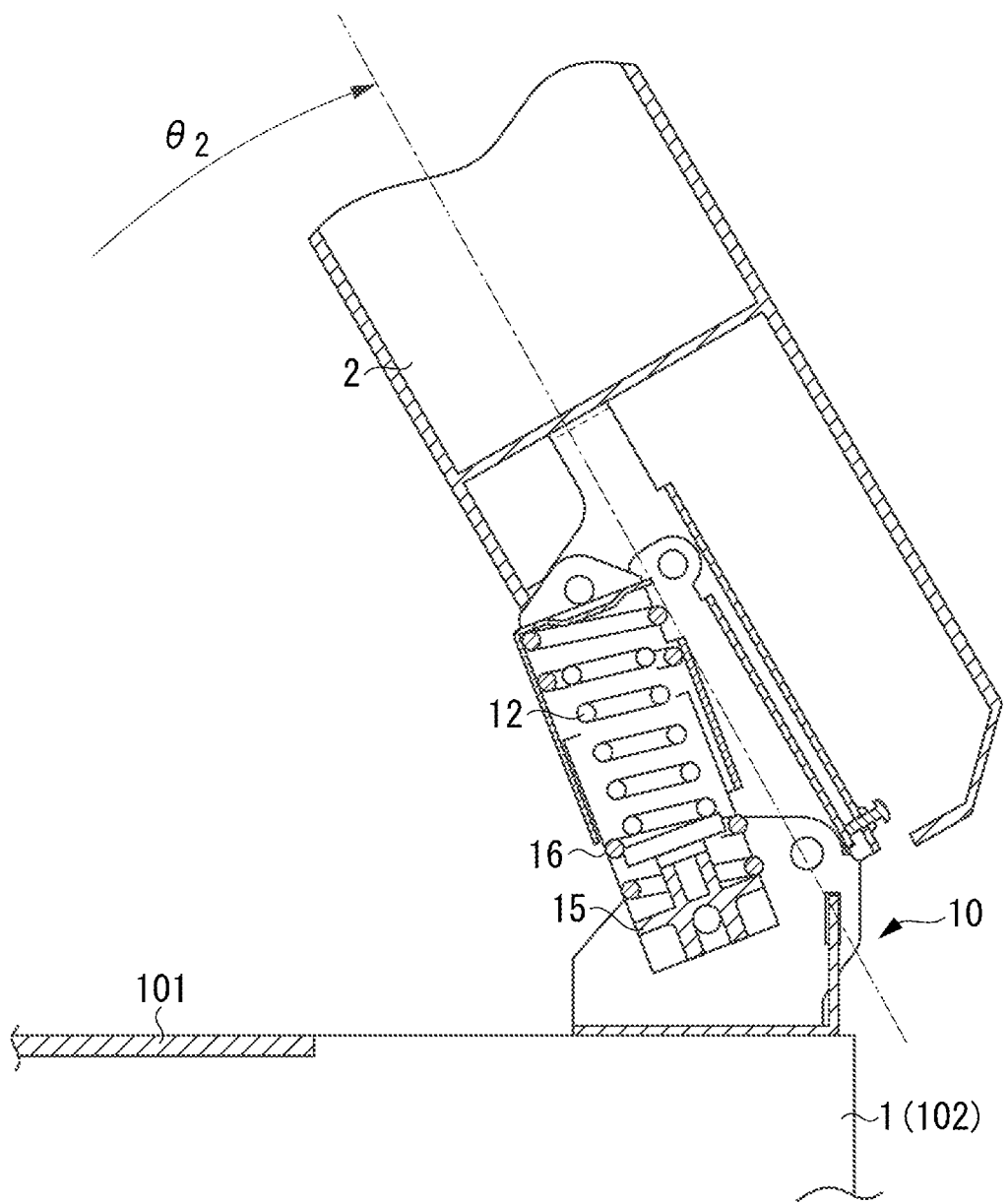
FIG. 7 is a diagram schematically illustrating a state where the hinge unit is freely stopped.
Figure 8:
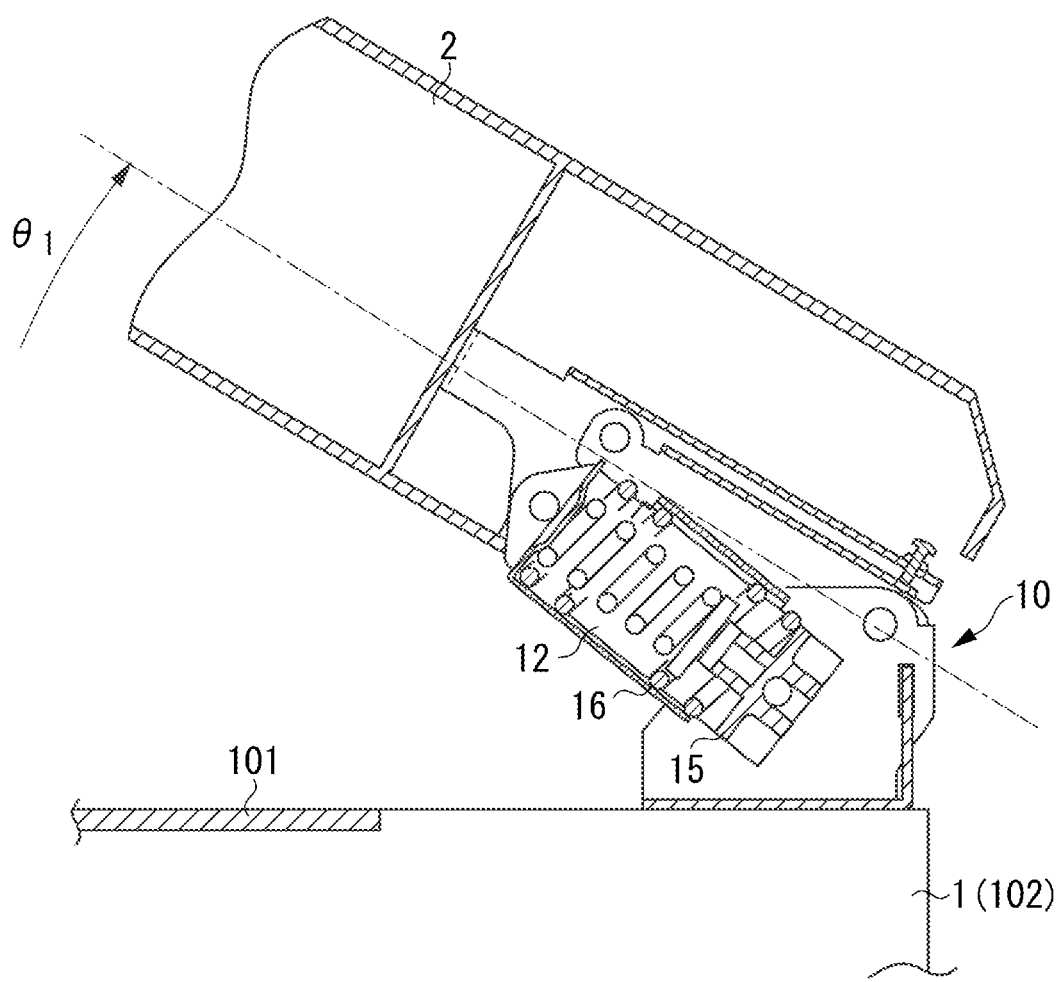
FIG. 8 is a diagram schematically illustrating a state where the hinge unit is flipped up.

Subsequently, FIGS. 7 and 8 are cross-sectional diagrams of the hinge unit 10 illustrating states where the automatic document feeding device 2 is opened up at angles of θ2 and θ1, respectively from a horizontal position. When the automatic document feeding device 2 is opened up, a space between the spring shafts 6 and 18 increases, and in conjunction with the increase in space, a space between the spring holders 17 and 15 increases by receiving the reaction force of the compression springs 12 and 16. As illustrated in FIGS. 7 and 8, both end portions of the compression spring 16 are in contact with the spring holders 17 and 15 at any of the opening angles θ1 and θ2. On the other hand, the compression spring 12 is completely separated from the spring holder 17 at the opening angle θ2 that is greater than the opening angle θ1. In other words, at the opening angle equal to or less than the opening angle θ1 at which the compression spring 12 is activated, the moment caused by the hinge spring force is set to be greater than the moment caused by the weight of the automatic document feeding device 2 in order to reduce the opening-closing force of the automatic document feeding device 2. Then, at the opening angle greater than the opening angle θ1 (i.e., opening angle θ2) at which the compression spring 12 is not activated, the moment caused by the weight of the automatic document feeding device 2 and the moment caused by the hinge spring force are set to be balanced with each other in order to make the automatic document feeding device 2 be freely stoppable at any opening angle.

Figure 9A:
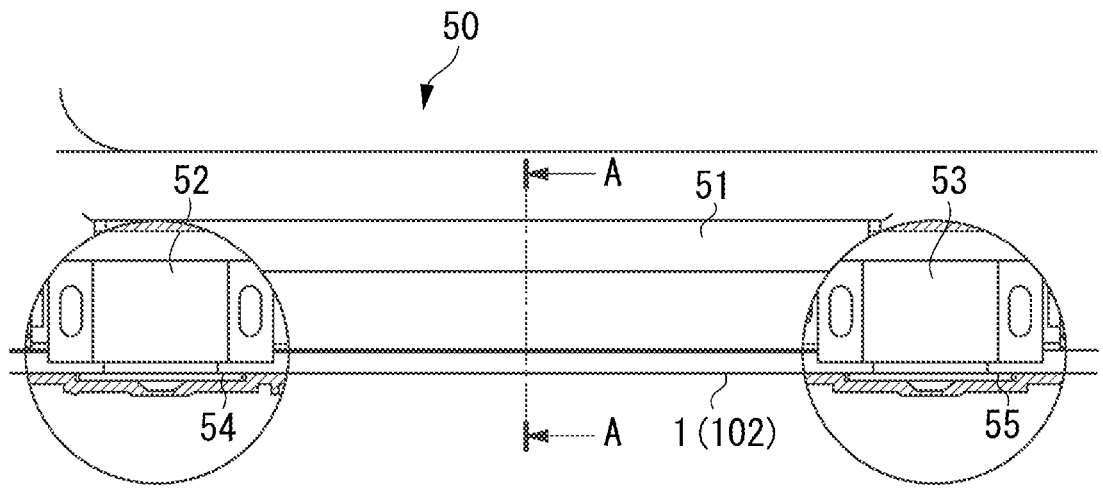
FIG. 9A is a diagram illustrating a configuration of a handgrip portion.
Figure 9B:
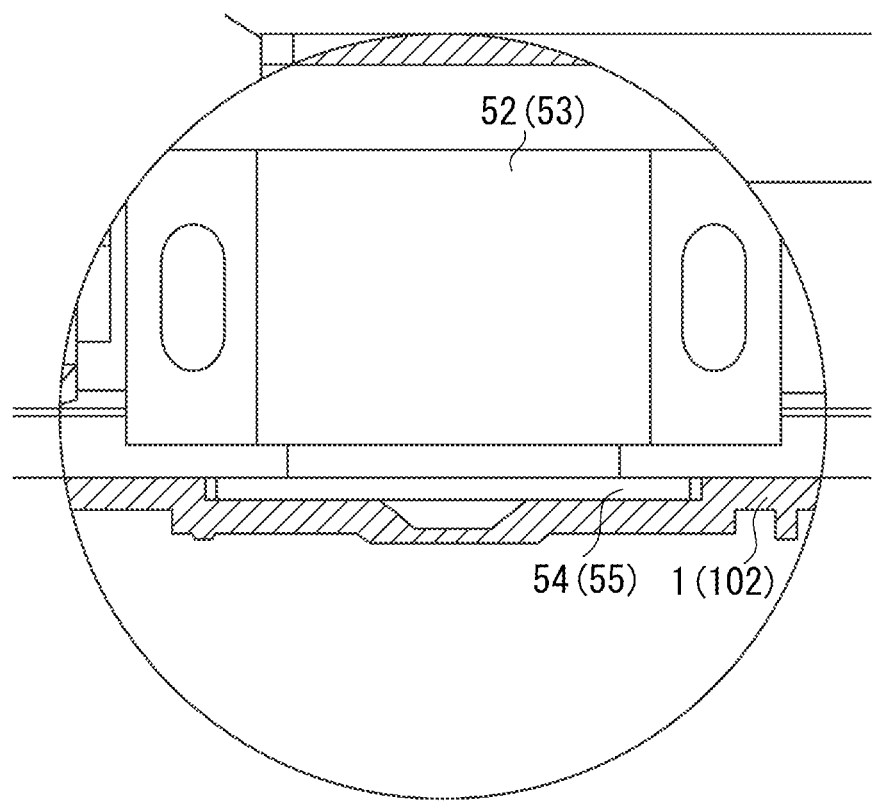
FIG. 9B is an enlarged view illustrating the configuration of the handgrip portion.
Figure 10A:
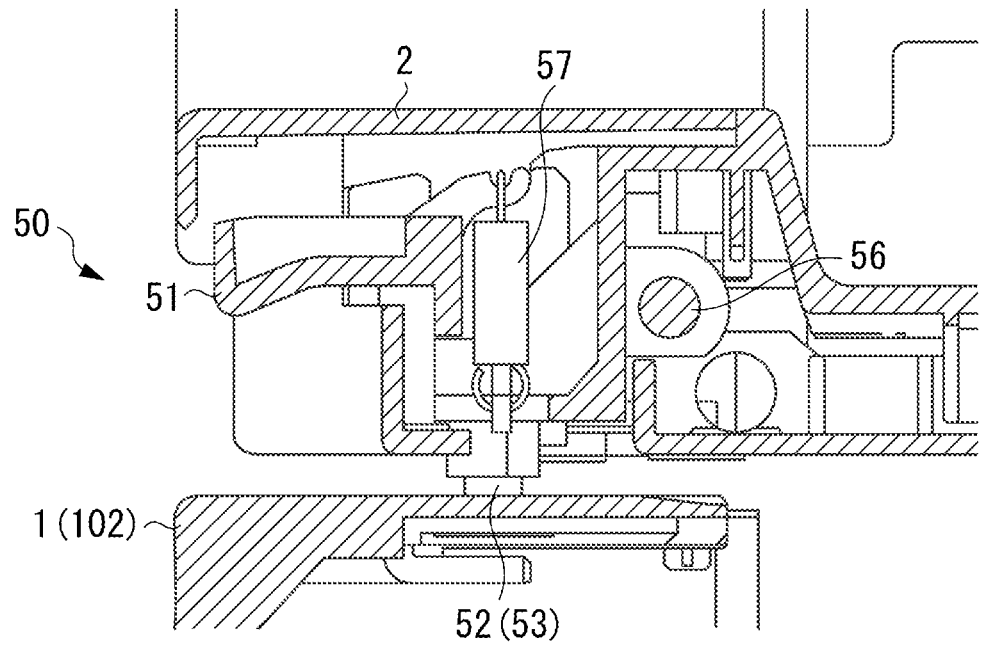
FIG. 10A is a diagram schematically illustrating a holding state of a holding unit.
Figure 10B:
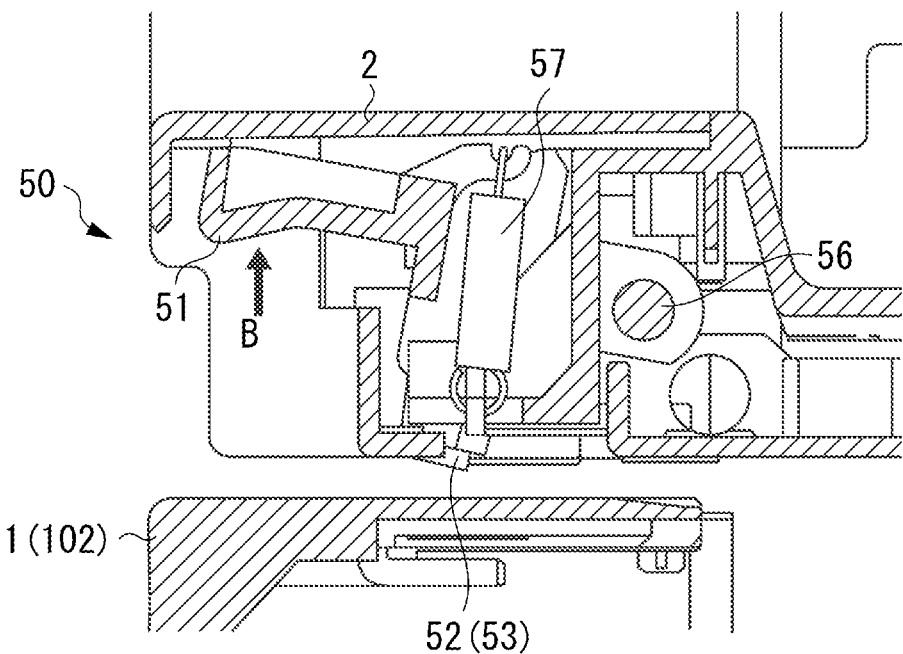
FIG. 10B is a diagram schematically illustrating a release state of the holding unit.

FIGS. 9A and 9B are diagrams in which a periphery of a handgrip portion 50 provided on a substantially central portion of a front face of the automatic document feeding device 2 is extracted. FIG. 9A is a front elevation view, and FIG. 9B is an enlarged view of holding units that hold the automatic document feeding device 2 in a position where the automatic document feeding device 2 covers the document positioning glass plate 101. Each of the holding units is configured of a magnet and a magnetic body described below. FIGS. 10A and 10B are cross-sectional diagrams taken along a line A-A in FIG. 9A. FIG. 10A is a cross-sectional diagram illustrating a state where the automatic document feeding device 2 is held by the holding unit relative to the frame member 102 (i.e., closing state) whereas FIG. 10B is a cross-sectional diagram illustrating a state where the holding state caused by the holding unit is released.

The handgrip portion (grip portion) 50 includes a handgrip 51 serving as a handle when the user opens or closes the automatic document feeding device 2. The handgrip 51 is rotatably attached to the automatic document feeding device 2 through a rotating shaft 56. The rotated handgrip 51 is returned to the original position by a return spring 57.

Magnets 52 and 53 respectively are disposed on both end portions of the handgrip 51. Magnetic bodies 54 and 55 such as metallic plates are disposed on the frame member 102, at positions on the opposite sides of the magnets 52 and 53. The automatic document feeding device 2 is held in a closing state relative to the frame member 102 because of the magnetic coupling force of the magnets 52, 53 and the magnetic bodies 54, 55. The holding units are disposed on both ends thereof with the handgrip 51 therebetween in order to hold the automatic document feeding device 2 parallel to the frame member 102 and the document positioning glass plate 101. A unit (not illustrated) that makes an adjustment of a mounting position (i.e., height) of the magnet 52 (53) is provided thereon so that the automatic document feeding device 2 can be held in a parallel state.

The user presses the handgrip 51 in a direction indicated by an arrow B in FIG. 10B in order to open or close the automatic document feeding device 2. With this operation, the handgrip 51 rotates about the rotating shaft 56 to make the magnets 52 and 53 attached to the handgrip 51 be separated from the magnetic bodies 54 and 55 attached to the frame member 102, so that the magnetic coupling force thereof is cancelled. When the magnetic coupling force is cancelled, the automatic document feeding device 2 is released from the holding state and automatically lifted up (i.e., flipped up) to open at the opening angle θ1 by only the spring force of the hinge unit 10.

<Positions of Handgrip 51, Holding Units, and Rotating Shaft 56>

In a case where the automatic document feeding device 2 incompletely lands on the document positioning glass plate 101 in a halfway opening state, a pressing force applied to the document placed on the document positioning glass plate 101 is weakened to cause reading failure of the image. Generally, a force of approximately 2 kgf to 3 kgf has to be applied to the handgrip 51 in order to reliably hold the automatic document feeding device 2 relative to the frame member 102. In other words, it is necessary for the holding units according to the present embodiment to have a magnetic coupling force of approximately 2 kgf to 3 kgf. According to the present embodiment, as illustrated in FIGS. 10A and 10B, the holding units are disposed between the handgrip 51 and the rotating shaft 56 while being arranged on a side of the rotating shaft 56 as close as possible. With this configuration, it is possible to easily (smoothly) release the holding force by applying the principle of leverage.

In the present embodiment, the magnets 52 and 53 are disposed on the automatic document feeding device 2 while the magnetic bodies 54 and 55 are disposed on the frame member 102. However, the magnets 52, 53, and the magnetic bodies 54, 55 may be disposed in an opposite manner. In other words, from among the frame member 102 and the automatic document feeding device 2, the magnets 52 and 53 may be disposed on one side while the magnetic bodies 54 and 55 are disposed on the other side.

Further, although two holding units are disposed on both sides of the handgrip 51, the number of holding units is not limited to two.

Furthermore, a configuration in which the handgrip 51 is rotated about the rotating shaft 56 has been described as a configuration for releasing the holding force. However, any configuration can be employed as long as a distance between the magnet and the magnetic body included in the holding unit can be increased. For example, a configuration may be such that a distance between the magnet and the magnetic body included in the holding unit is increased by sliding and moving the handgrip 51.

Subsequently, a size detection method of a document placed on the document positioning glass plate 101 will be described with reference to FIGS. 11 and 12.

Figure 11:
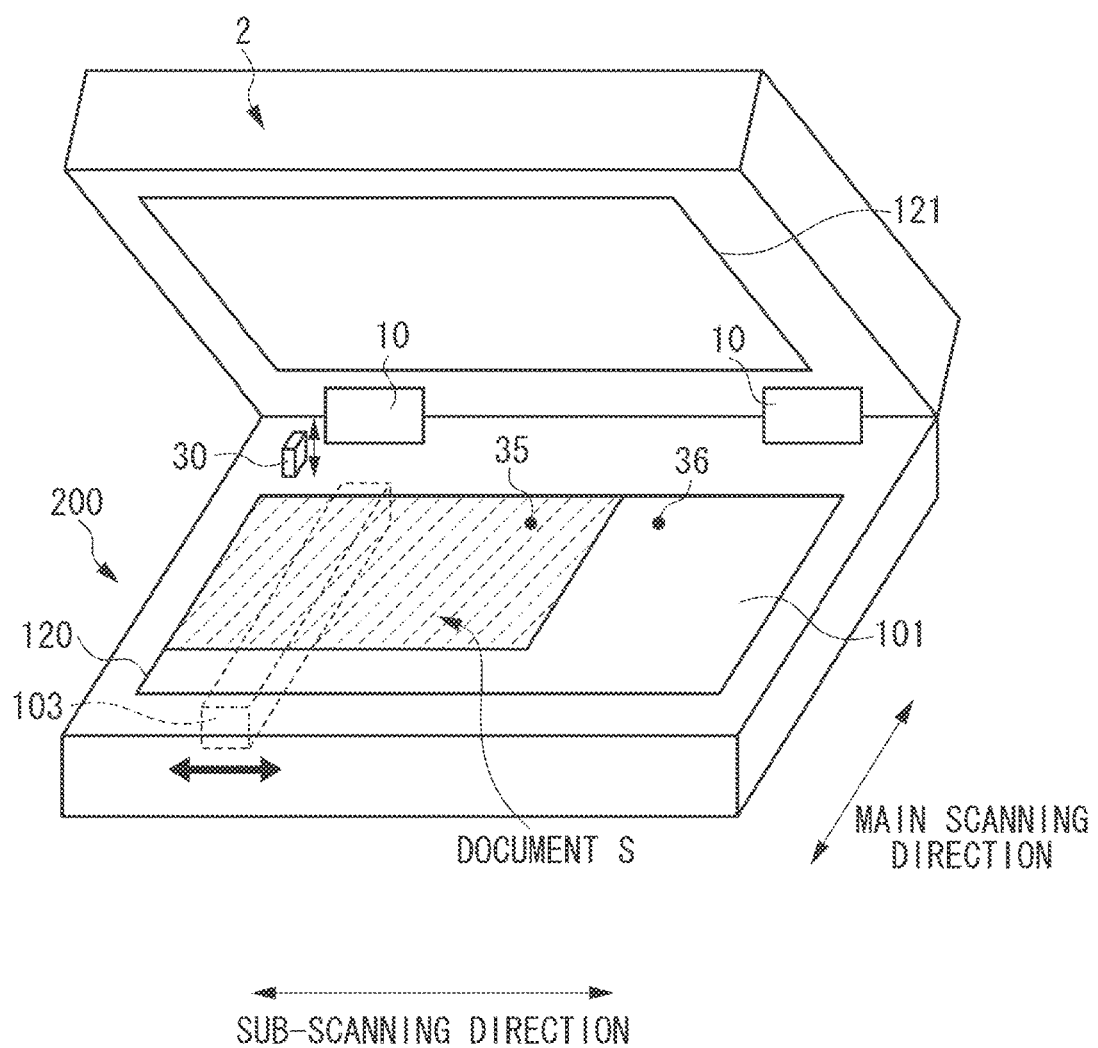
FIG. 11 is an explanatory diagram illustrating a size detection method according to the present invention.
Figure 12:
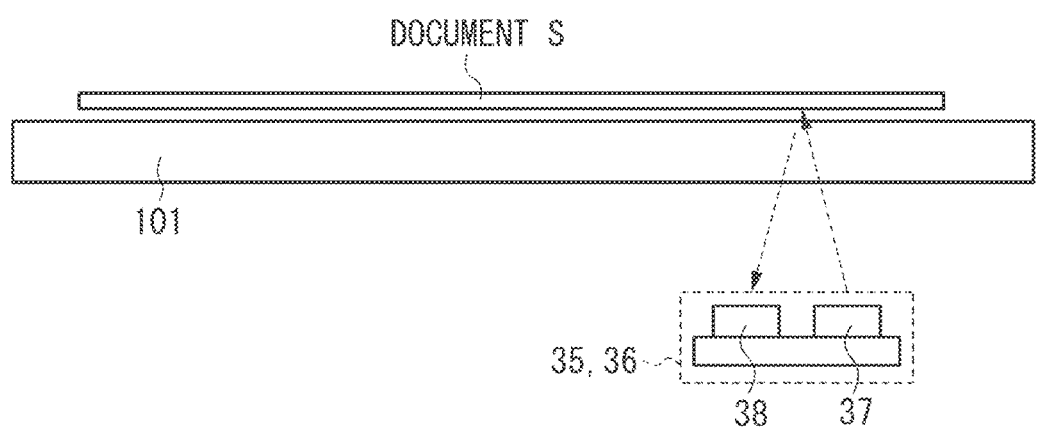
FIG. 12 is a diagram illustrating a configuration of an optical sensor for executing size detection.

FIGS. 11 and 12 are explanatory diagrams illustrating a document size detection method automatically executed before image reading processing of a document placed on the document positioning glass plate 101 is to be executed. FIG. 11 is a perspective view illustrating a state where the automatic document feeding device 2 is opened and a document is placed on the document positioning glass plate

101. FIG. 12 is a cross-sectional diagram of an optical sensor that detects a size of the document placed on the document positioning glass plate 101.

A document S is placed and set to a positioning portion 120 at the left end portion of the document positioning glass plate 101.

A size of the document S in a sub-scanning direction (i.e., breadthwise direction in FIG. 11) is detected by at least any one of optical sensors 35 and 36 arranged in the sub-scanning direction. As illustrated in FIG. 12, the optical sensor 35 (36) is configured of a reflection-type sensor. Only one of the optical sensors 35 and 36 is illustrated in FIG. 12 because configurations of the optical sensors 35 and 36 are common to each other. The light emitted from a light-emitting sensor (light-emitting portion) 37 is reflected on the document S placed on the document positioning glass plate 101 and incident on a light-receiving sensor (light-receiving portion) 38. Based on presence or absence of light incident on the light-receiving sensor 38, the optical sensor 35 (36) can detect to what extent the document S exists in a region in the sub-scanning direction.

A size of the document S in a main scanning direction (i.e., lengthwise direction) is detected by the scanning unit 103. A configuration of the scanning unit 103 is illustrated in FIG. 2. The light emitted from the illumination unit 108 is diffused from the document S and incident on the CCD 113 via the reflection mirrors 109, 110, 111, and the lens 112. Based on a range of light incident on the CCD 113, the scanning unit 103 can detect to what extent the document S exists in a region in the main scanning direction.

Then, a size of the document S is comprehensively determined based on the results of detection in the sub-scanning direction (i.e., breadthwise direction) and the main scanning direction (i.e., lengthwise direction). The optical sensors 35, 36, and the scanning unit 103 constitute a size detection unit for detecting a size of the document S.

The document S placed on the document positioning glass plate 101 is pressed against the document positioning glass plate 101 with a white-color document holding member 121 that is provided on the lower surface of the automatic document feeding device 2 in order to cover the entire surface of the document positioning glass plate 101. Therefore, when the automatic document feeding device 2 is closed, the document S cannot be detected because the document holding member 121 and the document S, both of which are in white color, cannot be distinguished from each other. On the other hand, when the automatic document feeding device 2 is widely opened, there is a risk in which external light that is different from the light emitted from the optical sensors 35, 36 or the scanning unit 103 is incident thereon.

Therefore, in the present embodiment, when the document size is to be detected, detection is executed twice in a state where the automatic document feeding device 2 is opened at predetermined angles. Specifically, the detection is executed once when the automatic document feeding device 2 is opened at an angle of 25 degrees to 35 degrees (i.e., first detection), and executed once when the automatic document feeding device 2 is nearly closed at an angle of greater than 0 degree and equal to or less than 5 degrees (i.e., second detection).

With respect to a region where the document S does not exist, the reflection light is not incident on the optical sensors 35, 36 and the CCD 113 in the first detection. On the other hand, in the second detection, although the light is not reflected on the document S, the light reflected on the document holding member 121 is incident thereon. Based on a change in presence or absence of reflection light incident on the respective sensors in the first and the second detections, the size of the document S is determined by determining the region where the document S does not exist. In a case where the size of the document S cannot be determined by the detection result, the user may input the information relating to the size through the operation unit 300.

In addition, the size of the document S may be determined based on only the first detection result (i.e., detection result when the automatic document feeding device 2 is opened at an angle of 25 degrees to 35 degrees).

An opening angle of the automatic document feeding device 2 is detected by an angle detection sensor (angle detection unit) 30. The angle detection sensor 30 is disposed to be able to contact the automatic document feeding device 2, and a push-in amount thereof caused by the contact is changed according to the opening angle of the automatic document feeding device 2. The angle detection sensor 30 detects the opening angle of the automatic document feeding device 2 based on the push-in amount. Based on the opening angle of the automatic document feeding device 2 detected by the angle detection sensor 30, the size information of the document S described below is reset, and detection of the size information is started.

In a case where a document size is detected, information relating to the detected document size, such as an A4-size or an A3-size, is stored in the RAM 403 serving as a storage unit. When the user presses a start key on the operation unit 300 in order to start an image-reading operation, the reading control unit 201 acquires the size information from the RAM 403, and controls the scanning unit 103 to read an image of a region based on the size information.

The size information stored in the RAM 403 is reset when the automatic document feeding device 2 is opened up at a third angle (described below) from the closing state. Here, "reset" refers to a state where the size information stored in the RAM 403 is deleted. Alternatively, "reset" refers to a state where a flag that indicates absence of the size information is stored in the RAM 403. A flag that indicates absence of the size information is deleted when the size detection unit detects a document size next time.

<Size Information Resetting Angle and Size Information Detection Starting Angle>

Figure 13:
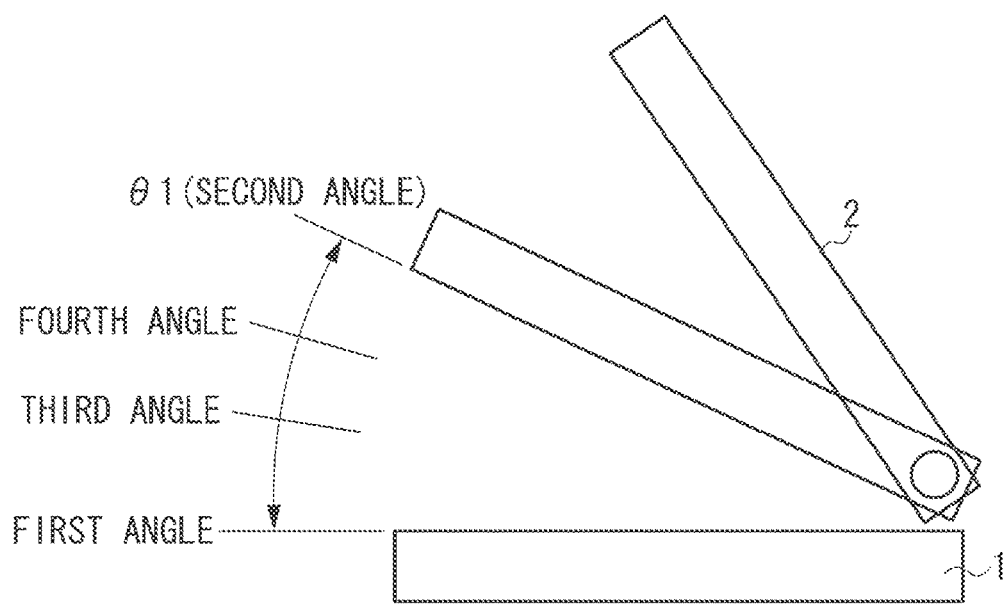
FIG. 13 is a diagram illustrating a relationship among an opening angle, a size information resetting angle, and a size information detection starting angle of the automatic document feeding device 2 according to a first embodiment.

FIG. 13 is a diagram illustrating a relationship among an opening angle, a size information resetting angle, and a size information detection starting angle of the automatic document feeding device 2.

A third angle at which the size information is reset is set to the angle between an angle at which the automatic document feeding device 2 is closed (i.e., first angle) and an angle at which the automatic document feeding device 2 that is released from a holding state caused by the holding unit is moved to open automatically (i.e., second angle). Further, a fourth angle at which the size detection is started is set to the angle between the second angle at which the automatic document feeding device 2 is moved to open automatically, and the third angle at which the size information is reset.

In the present embodiment, respective angles are set as follows.

The first angle at which the automatic document feeding device is closed is set to 0 degree.

The second angle at which the automatic document feeding device 2 that is released from a holding state caused by the holding unit is moved to open automatically is set to 40 degrees.

The third angle at which the size information is reset is set to 10 degrees.

The fourth angle at which the size detection is started is set to 25 degrees.

When the automatic document feeding device 2 is moved from the first angle to open at the third angle between the first angle and the second angle, the sheet size information stored in the RAM 403 is reset.

When the user releases the automatic document feeding device 2 from the holding state in order to replace the document S, the automatic document feeding device 2 is moved to open at an angle opened in the opening direction further than the angle at which the size information of the previous image-reading operation is reset. Therefore, it is possible to prevent the inconvenience in which an image is read based on the size information set for the previous image-reading operation even though the user has replaced the document S.

When the user moves the automatic document feeding device 2 in a closing direction after opening the automatic document feeding device 2 to replace the document S, the automatic document feeding device 2 is moved to open at the fourth angle at which size detection is started. Therefore, size detection of the replaced document S can be executed, and thus the image can be read based on the size information of the replaced document S.

In a second embodiment, size detection is started at an angle different from the angle described in the first embodiment. The other configurations such as the configuration of the automatic document feeding device 2 and the size detection method are the same as those described in the first embodiment, and thus descriptions thereof will be omitted.

Figure 14:
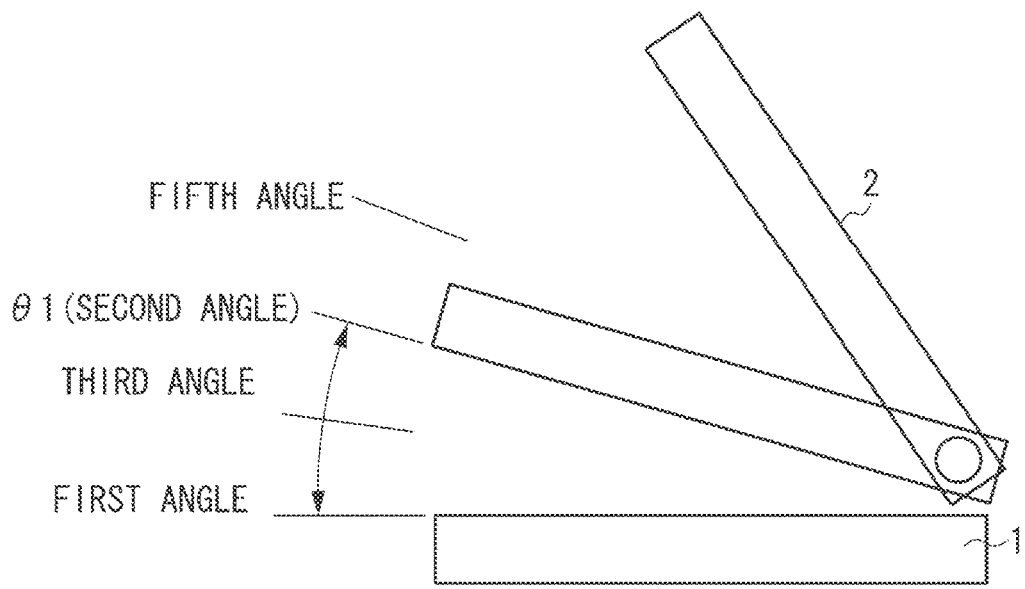
FIG. 14 is a diagram illustrating a relationship among an opening angle, a size information resetting angle, and a size information detection starting angle of the automatic document feeding device 2 according to a second embodiment.

FIG. 14 is a diagram illustrating a relationship among an opening angle, a size information resetting angle, and a size information detection starting angle of the automatic document feeding device 2.

A third angle at which the size information is reset is set to the angle between an angle at which the automatic document feeding device 2 is closed (i.e., first angle) and an angle at which the automatic document feeding device 2 that is released from the holding state caused by the holding unit is moved to open automatically (i.e., second angle). Further, a fifth angle at which the size detection is started is set to the angle opened in the opening direction further than the second angle at which the automatic document feeding device 2 is moved to open automatically.

In the present embodiment, respective angles are set as follows.

The first angle at which the automatic document feeding device 2 is closed is set to 0 degree.

The second angle at which the automatic document feeding device 2 that is released from the holding state caused by the holding unit is moved to open automatically is set to 30 degrees.

The third angle at which the size information is reset is set to 10 degrees.

The fifth angle at which the size detection is started is set to 40 degrees.

When the automatic document feeding device 2 is moved from the first angle to open at the third angle between the first angle and the second angle, the sheet size information stored in the RAM 403 is reset.

When the user releases the automatic document feeding device 2 from the holding state in order to replace the document S, the automatic document feeding device 2 is moved to open at the angle opened in the opening direction further than the angle at which the size information in the previous image-reading operation is reset. Therefore, it is possible to prevent the inconvenience in which an image is read based on the size information set for the previous image-reading operation even though the user has replaced the document S.

In a case where the second angle at which the automatic document feeding device 2 is automatically opened is too large in the opening direction, the handgrip portion 50 of the automatic document feeding device 2 is moved to a high place, so that it may be difficult for a user who is short in height to close the automatic document feeding device 2. Therefore, in the present embodiment, the angle at which the automatic document feeding device 2 is automatically opened is set to be smaller. Because the fifth angle at which the size detection is started is set to the angle opened in the opening direction further than the second angle at which the automatic document feeding device 2 is opened automatically, the size detection will not be started when the user simply closes the automatic document feeding device 2. However, the size information of the document S can be input from the operation unit 300 even if the user simply closes the automatic document feeding device 2. Further, the size detection can be executed when the user opens the automatic document feeding device 2 at the fifth angle at which the size detection is started.

Therefore, in the present embodiment, it is possible to prevent the inconvenience in which an image is read based on the size information set for the previous image-reading operation even though the user has replaced the document S. Further, it is possible to suppress the situation in which a user who is short in height has difficulty in closing the automatic document feeding device 2.

<Others>

In the above-described embodiments, an image reading apparatus provided on an electro-photographic image forming apparatus has been taken as an example. However, the image reading apparatus according to the present embodiment may be applied to an ink jet printer that forms an image by discharging ink onto a sheet.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-227607, filed Nov. 8, 2014, which is hereby incorporated by reference herein in its entirety.

What is claimed is:

1. An image reading apparatus comprising:
   an image reading unit configured to read the image of a sheet placed on a sheet positioning plate;
   an opening-closing unit configured to open or close with respect to the sheet positioning plate, and configured such that an opening angle of the opening-closing unit is defined as an angle of the opening-closing unit with respect to the sheet positioning plate;
   a holding unit configured to releasably hold the opening-closing unit at a first opening angle at which the opening-closing unit is closed on the sheet positioning plate;
   a hinge unit including a biasing portion for biasing the opening-closing unit in an opening direction, configured to rotatably support the opening-closing unit with respect to the sheet positioning plate, wherein in a case where the opening-closing unit is released from a holding state by the holding unit, the hinge unit is configured to move the opening-closing unit from the first opening angle to a second opening angle automatically by force applied by the biasing portion, the second opening angle being greater than the first opening angle;

a size detecting unit which detects a size of a sheet placed on the sheet positioning plate; and a storage unit which stores information relating to the sheet size detected by the size detecting unit, wherein the information relating to the sheet size stored in the storage unit is reset in a case where the opening-closing unit is moved from the first opening angle to a third opening angle that is between the first opening angle and the second opening angle, wherein in a case where the opening-closing unit is released from a holding state by the holding unit, the opening-closing unit is moved from the first opening angle to the second opening angle through the third opening angle by force applied by the biasing portion.

2. The image reading apparatus according to claim 1, wherein size detection of a sheet placed on the sheet positioning plate is started when the opening-closing unit moved to a fourth opening angle, the fourth opening angle being defined as an opening angle between the second opening angle and the third opening angle.

3. The image reading apparatus according to claim 1, wherein size detection of a sheet placed on the sheet positioning plate is started when the opening-closing unit moved to a fifth opening angle, the fifth opening angle being defined as an opening angle greater than the second opening angle.

4. The image reading apparatus according to claim 1, wherein, the opening-closing unit is urged such that the biasing portion generates a first moment that is greater than a moment caused by a weight of the opening-closing unit when the opening-closing unit is opened within a range between the first opening angle and the second opening angle, and generates a second moment that is balanced with the moment caused by the weight of the opening-closing unit when the opening-closing unit is opened at an opening angle greater than the second opening angle.

5. The image reading apparatus according to claim 1, wherein the opening-closing unit includes a sheet conveyance unit for conveying a sheet from which an image is to be read, to an image reading position of the image reading unit.

6. The image reading apparatus according to claim 1, wherein the size detecting unit includes an optical sensor having a light-emitting portion and a light-receiving portion.

7. The image reading apparatus according to claim 1, wherein the holding unit includes a magnet disposed on any one of a main body of the image reading apparatus and the opening-closing unit, and a magnetic body disposed on the other one of the apparatus main body of the image reading apparatus and the opening-closing unit.

8. The image reading apparatus according to claim 1, further comprising an angle detection unit configured to detect the opening angle of the opening-closing unit.

9. The image reading apparatus according to claim 1, further comprising a grip portion configured to be gripped by a user when an opening-closing operation of the opening-closing unit is performed, wherein a holding state of the holding unit is released when the grip portion is gripped by the user.

10. The image reading apparatus according to claim 1, wherein the opening-closing unit can be opened in the opening direction at an angle greater than the second opening angle.

11. An image forming apparatus comprising:

an image reading apparatus configured to read an image; and an image forming unit configured to form an image based on image information read by the image reading apparatus, wherein the image reading apparatus comprises:

an image reading unit configured to read the image of a sheet placed on a sheet positioning plate;

an opening-closing unit configured to open or close with respect to the sheet positioning plate, and configured such that an opening angle of the opening-closing unit is defined as an angle of the opening-closing unit with respect to the sheet positioning plate;

a holding unit configured to releasably hold the opening-closing unit at a first opening angle at which the opening-closing unit is closed on the sheet positioning plate;

a hinge unit including a biasing portion for biasing the opening-closing unit in an opening direction, configured to rotatably support the opening-closing unit with respect to the sheet positioning plate, wherein in a case where the opening-closing unit is released from a holding state by the holding unit, the hinge unit is configured to move the opening-closing unit from the first opening angle to a second opening angle automatically by force applied by the biasing portion, the second opening angle being greater than the first opening angle;

a size detecting unit which detects a size of a sheet placed on the sheet positioning plate; and a storage unit which stores information relating to the sheet size detected by the size detecting unit, wherein the information relating to the sheet size stored in the storage unit is reset in a case where the opening-closing unit is moved from the first opening angle to a third opening angle that is between the first opening angle and the second opening angle, wherein in a case where the opening-closing unit is released from a holding state by the holding unit, the opening-closing unit is moved from the first opening angle to the second opening angle through the third opening angle by force applied by the biasing portion.

12. The image forming apparatus according to claim 11, wherein the opening-closing unit can be opened in the opening direction at an angle greater than the second opening angle.

13. The image reading apparatus according to claim 1, wherein the size detecting unit detects the size of the sheet based on both a first detection result and a second detection result, the first detection result being a detection result detected in a case where the opening angle of the opening-closing unit is a fourth opening angle that is larger than the third opening angle, the second detection result being a detection result detected in a case where the opening-closing unit is moved to close from the fourth opening angle to a fifth opening angle that is between the first opening angle and the third opening angle.

14. The image reading apparatus according to claim 13, wherein the fourth opening angle is smaller than the second opening angle, and wherein the first detection result is a detection result detected in a case where the opening-closing unit is moved to close from an opening angle that is larger than the fourth opening angle to the fourth opening angle.

15. The image reading apparatus according to claim 13, wherein the fourth opening angle is larger than the second opening angle, and wherein the first detection result is a detection result detected in a case where the opening-closing unit is moved to open from the second angle to the fourth opening angle.

\* \* \* \* \*